(12) United States Patent
Sayre, III et al.

(10) Patent No.: US 9,792,303 B2
(45) Date of Patent: Oct. 17, 2017

(54) IDENTIFYING DATA FROM KEYWORD SEARCHES OF COLOR PALETTES AND KEYWORD TRENDS

(71) Applicant: Amazon Technologies, Inc., Reno, NV (US)

(72) Inventors: Paul Barnhart Sayre, III, Gig Harbor, WA (US); Jenny Ann Blackburn, Seattle, WA (US); Charles Shearer Dorner, Seattle, WA (US); Timothy Andrew Ong, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 490 days.

(21) Appl. No.: 14/315,995

(22) Filed: Jun. 26, 2014

(65) Prior Publication Data

US 2015/0379004 A1    Dec. 31, 2015

(51) Int. Cl.
  *G06F 17/30*    (2006.01)
(52) U.S. Cl.
  CPC .. *G06F 17/30265* (2013.01); *G06F 17/30274* (2013.01)
(58) Field of Classification Search
  CPC ............... G06F 17/30265; G06F 17/30274
  See application file for complete search history.

(56) References Cited

U.S. PATENT DOCUMENTS

| 5,508,718 A | 4/1996 | Haikin |
| 5,544,284 A | 8/1996 | Allebach et al. |
| 5,684,895 A | 11/1997 | Harrington |
| 5,822,503 A | 10/1998 | Gass, Jr. et al. |
| 6,014,125 A | 1/2000 | Herbert |
| 6,081,276 A | 6/2000 | Delp |
| 6,124,945 A | 9/2000 | Ishihara et al. |
| 6,385,336 B1 | 5/2002 | Jin |
| 6,513,014 B1 | 1/2003 | Walker et al. |
| 6,577,759 B1 | 6/2003 | Caron et al. |
| 7,136,074 B2 | 11/2006 | Hussie |
| 7,444,658 B1 | 10/2008 | Matz et al. |

(Continued)

FOREIGN PATENT DOCUMENTS

| JP | 2012-221317 A | 11/2012 |
| WO | WO 2014/070914 A1 | 5/2014 |

(Continued)

OTHER PUBLICATIONS

"Color Blind Assistant." iPhone Apps Versions 2.61 and 2.62; Release date Oct. 14-15, 2009; pp. 1-7.

(Continued)

*Primary Examiner* — Dinku Gebresenbet
(74) *Attorney, Agent, or Firm* — Knobbe, Martens, Olson & Bear, LLP

(57) ABSTRACT

Systems and methods are described herein to determine data associated with keyword searches of color palettes based at least in part on keyword trends. A keyword trend may include popular colors of color palettes associated with the keyword. Color palettes may be searched by name or other data associated with the color palettes. Furthermore, color palettes associated with a keyword may be filtered by color trends and/or keyword trends. The items and/or images associated with the filtered color palettes may be identified and presented to a user.

20 Claims, 10 Drawing Sheets

(56) References Cited

U.S. PATENT DOCUMENTS

| | | | |
|---|---|---|---|
| 7,801,893 | B2 | 9/2010 | Gulli' et al. |
| 7,961,938 | B1 | 6/2011 | Remedios |
| 8,416,255 | B1 | 4/2013 | Gilra |
| 8,553,045 | B2 | 10/2013 | Skaff et al. |
| 8,576,241 | B1 | 11/2013 | Kanter et al. |
| 8,634,640 | B2 | 1/2014 | Bhatti et al. |
| 8,762,419 | B2 | 6/2014 | Moroney |
| 8,867,798 | B2 | 10/2014 | Shuster |
| 9,047,804 | B1 | 6/2015 | Moroney et al. |
| 9,135,719 | B1 | 9/2015 | Dorner et al. |
| 9,177,391 | B1 | 11/2015 | Dorner et al. |
| 9,245,350 | B1 | 1/2016 | Dorner et al. |
| 9,311,889 | B1 | 4/2016 | Dorner et al. |
| 9,396,560 | B2 | 7/2016 | Dorner et al. |
| 9,401,032 | B1 | 7/2016 | Dorner et al. |
| 9,514,543 | B2 | 12/2016 | Dorner et al. |
| 9,524,563 | B2 | 12/2016 | Sayre et al. |
| 9,542,704 | B2 | 1/2017 | Dorner et al. |
| 9,552,656 | B2 | 1/2017 | Dorner et al. |
| 9,633,448 | B1 | 4/2017 | Dorner |
| 2001/0028464 | A1 | 10/2001 | Aritomi |
| 2002/0080153 | A1 | 6/2002 | Zhao et al. |
| 2003/0004938 | A1 | 1/2003 | Lawder |
| 2003/0011612 | A1 | 1/2003 | Luo et al. |
| 2003/0083850 | A1 | 5/2003 | Schmidt et al. |
| 2003/0142124 | A1 | 7/2003 | Takata et al. |
| 2003/0146925 | A1 | 8/2003 | Zhao et al. |
| 2004/0090453 | A1 | 5/2004 | Jasinschi et al. |
| 2005/0122427 | A1 | 6/2005 | Hougui et al. |
| 2005/0149411 | A1 | 7/2005 | Colwell |
| 2005/0222978 | A1 | 10/2005 | Drory et al. |
| 2006/0023082 | A1 | 2/2006 | Higuchi |
| 2006/0066629 | A1 | 3/2006 | Norlander et al. |
| 2006/0248081 | A1* | 11/2006 | Lamy .............. G01J 3/46 707/999.007 |
| 2006/0250669 | A1 | 11/2006 | Beretta |
| 2006/0268120 | A1 | 11/2006 | Funakura et al. |
| 2007/0100786 | A1 | 5/2007 | Moroney |
| 2008/0003547 | A1 | 1/2008 | Woolfe et al. |
| 2008/0025629 | A1 | 1/2008 | Obrador et al. |
| 2008/0025647 | A1 | 1/2008 | Obrador et al. |
| 2008/0046410 | A1 | 2/2008 | Lieb |
| 2008/0046424 | A1 | 2/2008 | Horton |
| 2008/0069442 | A1 | 3/2008 | Itoh |
| 2008/0301582 | A1 | 12/2008 | Gluck |
| 2008/0317336 | A1 | 12/2008 | Mojsilovic |
| 2009/0027414 | A1 | 1/2009 | Vaughn |
| 2009/0041345 | A1 | 2/2009 | Tirumalareddy et al. |
| 2009/0055758 | A1 | 2/2009 | Sim et al. |
| 2009/0157595 | A1 | 6/2009 | Gubitz |
| 2009/0227375 | A1 | 9/2009 | Weisman et al. |
| 2009/0248626 | A1 | 10/2009 | Miller |
| 2009/0259567 | A1 | 10/2009 | Watts |
| 2009/0281925 | A1 | 11/2009 | Winter et al. |
| 2010/0027834 | A1 | 2/2010 | Spitzig et al. |
| 2010/0053201 | A1 | 3/2010 | Klassen et al. |
| 2010/0082654 | A1 | 4/2010 | Zhang et al. |
| 2010/0110455 | A1 | 5/2010 | Woolfe |
| 2010/0158412 | A1 | 6/2010 | Wang et al. |
| 2011/0135195 | A1 | 6/2011 | Marchesotti et al. |
| 2011/0205231 | A1 | 8/2011 | Hartley et al. |
| 2011/0305386 | A1 | 12/2011 | Wang et al. |
| 2011/0319160 | A1 | 12/2011 | Arn et al. |
| 2012/0036163 | A1 | 2/2012 | Myers et al. |
| 2012/0045121 | A1* | 2/2012 | Youngman ......... G06Q 30/0601 382/162 |
| 2012/0075329 | A1 | 3/2012 | Skaff et al. |
| 2012/0099784 | A1 | 4/2012 | Marchesotti et al. |
| 2012/0099788 | A1 | 4/2012 | Bhatti et al. |
| 2012/0109944 | A1 | 5/2012 | Hao |
| 2012/0154420 | A1 | 6/2012 | Calandrino et al. |
| 2012/0163710 | A1 | 6/2012 | Skaff et al. |
| 2012/0206477 | A1 | 8/2012 | Yanagisawa |
| 2013/0013991 | A1 | 1/2013 | Evans |
| 2013/0033603 | A1 | 2/2013 | Suzuki et al. |
| 2013/0050238 | A1 | 2/2013 | Bergou et al. |
| 2013/0148741 | A1 | 6/2013 | Steinberg et al. |
| 2013/0226659 | A1 | 8/2013 | Patel et al. |
| 2013/0227636 | A1 | 8/2013 | Bettini et al. |
| 2013/0235398 | A1 | 9/2013 | Bhatti et al. |
| 2013/0266217 | A1 | 10/2013 | Gershon et al. |
| 2014/0037200 | A1 | 2/2014 | Phillips et al. |
| 2014/0044349 | A1 | 2/2014 | Wang et al. |
| 2014/0049799 | A1 | 2/2014 | Li et al. |
| 2014/0052584 | A1 | 2/2014 | Gershon et al. |
| 2014/0067014 | A1 | 3/2014 | Kaula et al. |
| 2014/0089781 | A1 | 3/2014 | Hoguet |
| 2014/0153821 | A1 | 6/2014 | Masuko et al. |
| 2014/0177952 | A1 | 6/2014 | Masuko |
| 2014/0189476 | A1 | 7/2014 | Berthelot et al. |
| 2014/0270498 | A1 | 9/2014 | Chester et al. |
| 2014/0300775 | A1 | 10/2014 | Fan et al. |
| 2014/0304661 | A1 | 10/2014 | Topakas et al. |
| 2014/0334722 | A1 | 11/2014 | Bloore et al. |
| 2014/0355874 | A1 | 12/2014 | Sakamaki et al. |
| 2015/0235110 | A1 | 8/2015 | Curtis et al. |
| 2015/0235389 | A1 | 8/2015 | Miller et al. |
| 2015/0262549 | A1 | 9/2015 | Moroney |
| 2015/0269747 | A1 | 9/2015 | Hogan et al. |
| 2015/0324392 | A1 | 11/2015 | Becker et al. |
| 2015/0324394 | A1 | 11/2015 | Becker et al. |
| 2015/0332479 | A1 | 11/2015 | Gershon et al. |
| 2015/0378999 | A1 | 12/2015 | Dorner et al. |
| 2015/0379000 | A1 | 12/2015 | Haitani et al. |
| 2015/0379001 | A1 | 12/2015 | Gunningham et al. |
| 2015/0379002 | A1 | 12/2015 | Dorner et al. |
| 2015/0379003 | A1 | 12/2015 | Dorner et al. |
| 2015/0379005 | A1 | 12/2015 | Dorner et al. |
| 2015/0379006 | A1 | 12/2015 | Dorner et al. |
| 2015/0379071 | A1 | 12/2015 | Dorner et al. |
| 2015/0379608 | A1 | 12/2015 | Dorner et al. |
| 2015/0379731 | A1 | 12/2015 | Dorner et al. |
| 2015/0379732 | A1 | 12/2015 | Sayre et al. |
| 2015/0379733 | A1 | 12/2015 | Dorner et al. |
| 2015/0379738 | A1 | 12/2015 | Gunningham et al. |
| 2015/0379739 | A1 | 12/2015 | Dorner et al. |
| 2015/0379743 | A1 | 12/2015 | Dorner et al. |
| 2015/0379959 | A1 | 12/2015 | Dorner et al. |
| 2016/0005188 | A1 | 1/2016 | Dorner et al. |
| 2016/0005201 | A1 | 1/2016 | Kunkel et al. |
| 2016/0104303 | A1 | 4/2016 | Dorner et al. |
| 2016/0335784 | A1 | 11/2016 | Dorner et al. |
| 2017/0084053 | A1 | 3/2017 | Dorner et al. |
| 2017/0098314 | A1 | 4/2017 | Sayre et al. |

FOREIGN PATENT DOCUMENTS

| | | | |
|---|---|---|---|
| WO | WO 2015/145766 | A1 | 10/2015 |
| WO | WO 2015/200502 | A1 | 12/2015 |
| WO | WO 2015/200505 | A1 | 12/2015 |
| WO | WO 2015/200509 | A1 | 12/2015 |
| WO | WO 2015/200515 | A1 | 12/2015 |
| WO | WO 2015/200523 | A1 | 12/2015 |

OTHER PUBLICATIONS

"Color Name & Hue." Wayback Machine Archive; May 16, 2013; pp. 1-17. <http://web.archive.org/web/20130516202647/http://www.color-blindness.com/color-name-hue>.

"HTML Color Picker," Wayback Machine Archive; Feb. 15, 2013; 1 page. <http://web.archive.org/web/20130215181242/http://imagecolorpicker.com/>.

"Tin Eye Labs." Wayback Machine Archive; Sep. 20, 2012; pp. 1-3. <http://web.archive.org/web/20120920051712/http://labs.tineye.com/color/>.

Delon, J., et al., Automatic Color Palette, Proceedings of the International Conference on Image Processing, vol. 2, Sep. 11-14, 2005, pp. 706-709.

Nickerson, D., et al., Central Notations for ISCC-NBS Color Names, Journal of the Optical Society of America, vol. 31; pp. 587-591; Sep. 1941.

(56) References Cited

OTHER PUBLICATIONS

Das et al, Indexing Flower Patent Images Using Domain Knowledge, IEEE Intelligent Systems, vol. 14, No. 5; 1999, pp. 24-33.
"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.
Bell, E., Color Detection: Technology on Heels With Lyst Engineering, dated Feb. 22, 2014, retrieved Apr. 7, 2014, <http://developers.lyst.com/data/images/2014/02/22/color-detection/>.
Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.
Csurka, Gabriela, et al.; "Learning moods and emotions from color combinations," Proceedings of the Seventh Indian Conference on Computer Vision, Graphics and Image Processing, pp. 298-305; New York; Dec. 12, 2010.
Das et al., "Indexing flowers by color names using domain knowledge-driven segmentation," Proc. The Fourth IEEE Workshop on Applications of Computer Vision; pp. 94-99; 1998.
Dorner, C.S., Image-Based Color Palette Generation, U.S. Appl. No. 14/316,483, filed Jun. 26, 2014.
Dorner, C.S., Automatic Image-Based Recommendations Using a Color Palette, U.S. Appl. No. 14/316,268, filed Jun. 26, 2014.
Global Color Survey, http://www.colorcom.com/global-color-survey, Feb. 1, 2001, accessed Sep. 11, 2015.
Heer, Jeffrey, et al.; "Color naming models for color selection, image editing and palette design," Proceedings of the 2012 ACM Annual Conference on Human Factors in Computing Systems, pp. 1007-1016; New York; May 5, 2012.
Lawder, Jonathan, "The Application of Space-filling Curves to the Storage and Retrieval of Multidimensional Data," PhD thesis; Sections 4.3.5.1, p. 68, and 6.5, pp. 121-130; Jan. 1, 2000.
Luo, J., et al., "Novel Color Palettization Scheme for Preserving Important Colors," Proceedings SPIE 5008. Color Imaging VIII: Processing, Hardcopy, and Applications; Jan. 20, 2003.
Montagne, C., et al., "Adaptive Color Quantization Using the Baker's Transformation," J. Electronic Imaging 15(2), Apr.-Jun. 2006, 21 pages.
Periasamy, P.S., et al., "A Common Palette Creation Algorithm for Multiple Images with Transparency Information," Proceedings of the International Conference on Advances in Computing, Control, and Telecommunication Techologies, IEEE 2009.
Tremeau et al., "A vector quantization algorithm based on the nearest neighbor of the furthest color," Proceedings of International Conference on Image Processing, vol. 3, pp. 682-685, Oct. 26-29, 1997.
Tropf, H. et al., "Multidimensional range search in dynamically balanced trees," Angewandte Informatik (Applied Informatics), pp. 71-77; Braunschweig, Germany; Feb. 1, 1981.
Wang et al., "Contextual Dominant Color Name Extraction for Web Image Search," 2012 IEEE International Conference on Multimedia and Expo Workshops (ICMEW), pp. 319-324.
Yu, M.P., et al., "Contextual Algorithm for Color Quantization," J. Electronic Imaging 12(3):442-447, Jul. 2003.
Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.
International Search Report and Written Opinion in PCT/US2015/037469 mailed on Oct. 1, 2015.
International Search Report and Written Opinion in PCT/US2015/037456 mailed on Sep. 9, 2015.
International Search Report and Written Opinion in PCT/US2015/037494 mailed on Sep. 14, 2015.
International Search Report and Written Opinion in PCT/US2015/037465 mailed on Oct. 27, 2015.
International Search Report and Written Opinion in PCT/US2015/037481 mailed on Sep. 14, 2015.
Balasubramanian, Raja, et al.; Sequential Scalar Quantization of Color Images, Journal of Electronic Imaging, vol. 3, No. 1, pp. 45-59; Jan. 1994.

* cited by examiner

| | | | | | |
|---|---|---|---|---|---|
| TIME 1:<br>PALETTE 1<br>VOTES = A | COLOR 1 | COLOR 2 | COLOR 3 | COLOR 4 | COLOR 5 | 802A |
| TIME 2:<br>PALETTE 1<br>VOTES = B | COLOR 1 | COLOR 5 | COLOR 6 | COLOR 7 | COLOR 4 | 802B |
| TIME 3:<br>PALETTE 1<br>VOTES = C | COLOR 1 | COLOR 2 | COLOR 6 | COLOR 9 | COLOR 7 | 802C |
| TIME 4:<br>PALETTE 1<br>VOTES = D | COLOR 1 | COLOR 2 | COLOR 6 | COLOR 4 | COLOR 11 | 802D |

*Fig. 8A.*

| | | | | | |
|---|---|---|---|---|---|
| TIME 1:<br>PALETTE 2<br>VOTES = D | COLOR 1 | COLOR 2 | COLOR 3 | COLOR 4 | COLOR 5 | 804A |
| TIME 1:<br>PALETTE 3<br>VOTES = E | COLOR 1 | COLOR 5 | COLOR 6 | COLOR 7 | COLOR 8 | 804B |
| TIME 2:<br>PALETTE 2<br>VOTES = F | COLOR 1 | COLOR 2 | COLOR 3 | COLOR 4 | COLOR 5 | 804C |
| TIME 2:<br>PALETTE 4<br>VOTES = G | COLOR 1 | COLOR 2 | COLOR 6 | COLOR 9 | COLOR 11 | 804D |

*Fig. 8B.*

TIME 1:
"SPRINGTIME" — 910

| PALETTE 1: "SPRING" | COLOR 1 | COLOR 7 | COLOR 3 | COLOR 4 | COLOR 9 | — 902A |
| PALETTE 2: "SPRINGTIME YELLOW" | COLOR 1 | COLOR 5 | COLOR 6 | COLOR 3 | COLOR 10 | — 902B |
| PALETTE 3 "BLOSSOM" | COLOR 2 | COLOR 1 | COLOR 11 | COLOR 19 | COLOR 7 | — 902C |
| PALETTE 4 "SPRINGTIME WALK" | COLOR 17 | COLOR 2 | COLOR 9 | COLOR 1 | COLOR 5 | — 902D |

TIME 2:
"SPRINGTIME" — 910

| PALETTE 1: "SPRING" | COLOR 1 | COLOR 2 | COLOR 3 | COLOR 4 | COLOR 9 | — 904A |
| PALETTE 5: "SPRINGTIME GREEN" | COLOR 13 | COLOR 14 | COLOR 16 | COLOR 3 | COLOR 10 | — 904B |
| PALETTE 6 "BRIGHT SPRING" | COLOR 13 | COLOR 18 | COLOR 20 | COLOR 19 | COLOR 3 | — 904C |
| PALETTE 7 "SPRINGTIME FOREST" | COLOR 13 | COLOR 12 | COLOR 9 | COLOR 14 | COLOR 7 | — 904D |

*Fig. 9.*

IDENTIFYING DATA FROM KEYWORD SEARCHES OF COLOR PALETTES AND KEYWORD TRENDS

BACKGROUND

Generally described, computing devices may search for information based on a keyword and provide results related to colors. A color or color palettes may be associated with clothes, artwork, images, video, and other visual media to provide a certain or desired look and feel. In electronic commerce, items are associated with various colors or color palettes. In one system, an image or record may be tagged with a color description in a data store. A user may input a keyword (e.g., "green") and any images or records matching the keyword "green" may be returned in a search. In another system, user generated color palettes may be stored by name. A user may input a keyword (e.g., "pastel") and color palettes with names exactly matching the keyword "pastel" may be returned in a search.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIGS. 8A-B illustrates example color palettes associated with historical data.

FIG. 9 illustrates example color palettes associated with historical keyword data.

DETAILED DESCRIPTION

Figure 1:
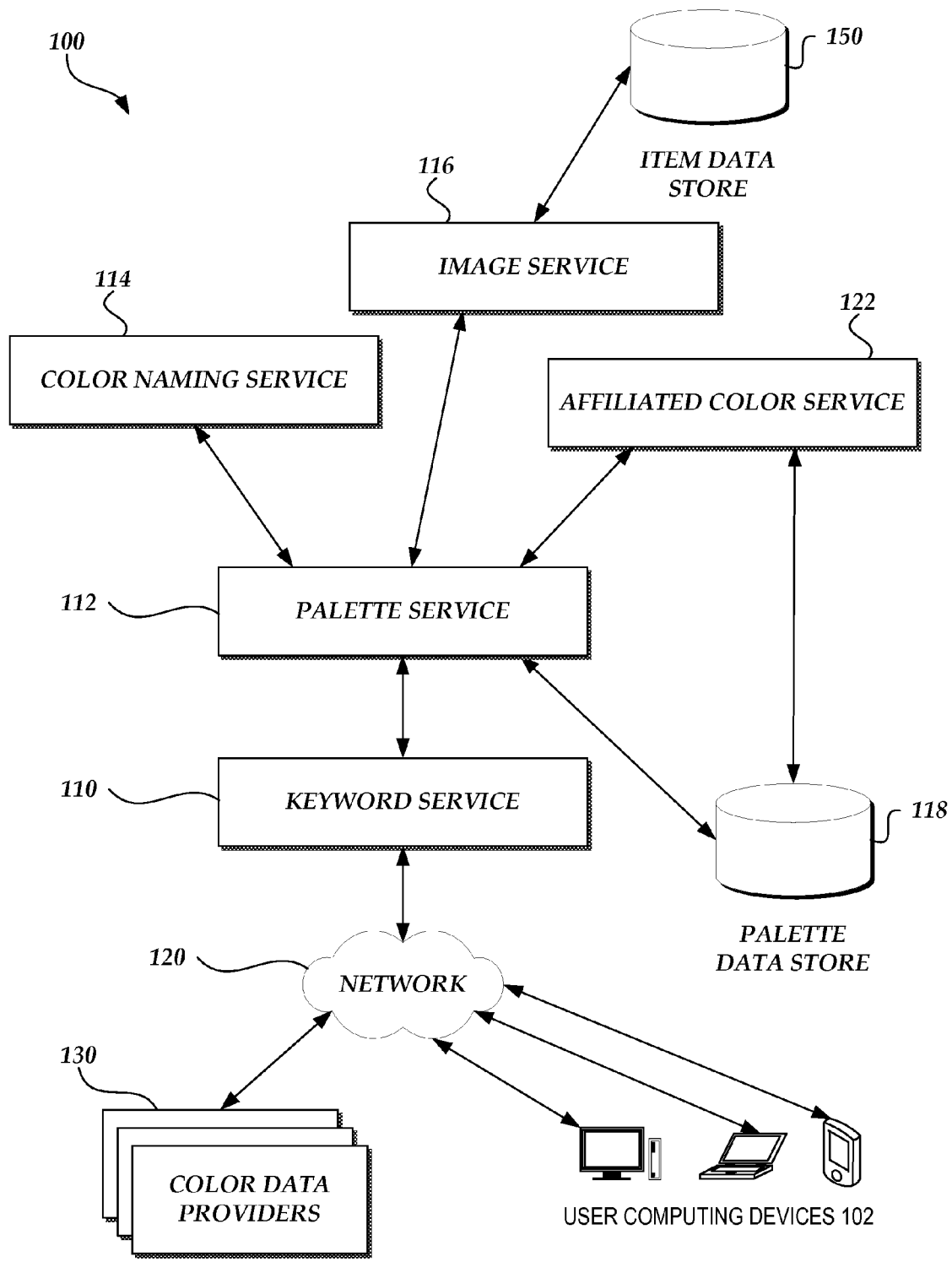
FIG. 1 illustrates a block diagram of an example operating environment for determining data based on keyword searches of one or more color palettes.

Generally described, aspects of the present disclosure relate to identifying images or items (e.g., goods and/or services) based on a keyword search of color palettes that have been ranked or voted on by people. The present disclosure includes systems and methods configured to identify data associated with a keyword search of color palettes. The keyword may be a non-color term suggestive of one or more colors. In one example, a merchandiser searches for a term and/or phrase such as "rainy day." Color palettes associated with the search term may be retrieved based on human generated names of the color palettes. Each color palette may include one or more colors. A fast color search may be performed on each color to retrieve one or more items and/or images sufficiently including that color. In the merchandiser example, the items, which are associated with colors from the retrieved human generated color palettes, may be returned to the merchandiser.

Palettes of colors can be used to design visual articles, such as artwork or clothes, so that the article is visually appealing. This can increase the desirability of the article. In addition, palettes of colors can be used to evoke targeted reactions or emotions that are associated with a look and feel of a visual presentation or article. For example, the colors of clothes can be selected to reflect trends in colors or to reflect a more classic or timeless look.

Systems may be designed to automatically generate color combinations. These systems may use algorithms to determine complementary colors, similar colors, colors arranged in a color space to cover predetermined color distances, and the like to generate a palette of colors. However, mathematical and/or computer algorithms may not account for trends in taste and human color preferences. Individuals can also create color palettes. The resulting color palettes may be different than the formulaic or predictable palettes, which are generated automatically, yet visually appealing at least to the individual that created it. These color palettes may be ones that would generally not be created by a mathematical and/or computer algorithm (e.g., a color palette that includes seemingly clashing colors). Furthermore, humans may associate other metadata with the color palettes, such as, names and/or tags, which may otherwise be difficult for a computer system to do automatically and/or programmatically. These color palettes may then be searched (by name and/or metadata) and associated with items for display to a user. Thus, reliance on human generated color palettes may yield color palettes more visually interesting to users and/or with a wider variety of colors than palettes that are automatically generated by systems that do not rely on human color preferences.

Aspects of the present disclosure use one or more data stores of color palettes, which have been rated, ranked, and/or voted on by a community of people to indicate which color combinations are preferred by that community. As described herein, the color palettes and/or affiliated colors may be searched, determined, and/or retrieved. The color palettes and/or affiliated colors may contain colors, which are visually appealing or preferable because each color and/or color palette has been determined by the community. Affiliated colors will be discussed in further detail below with reference to FIG. 4.

While a retail environment is often used as an example below, it will be appreciated that image, data, and/or color identification from keyword and/or text searching of color palettes, as disclosed herein, may be used in a variety of environments other than a retail environment. For example, aspects of the present disclosure, in some embodiments, may be used and/or implemented to efficiently identify or surface images and/or colors related to color palettes within any user interface, page, video, electronic book and/or other electronic content. In addition, aspects of the present disclosure, in some embodiments, may be used by consumers, merchandisers, designers, architects, artists, landscapers, developers, garners, students, etc. for virtually any purpose.

Without limitation, aspects of the present disclosure may be used for identifying images and/or colors related to color palettes in social networking contexts, digital photo albums, digital news articles, and/or visual bookmarking contexts. For illustrative purposes, item images are often described below in the context of items listed in an electronic catalog. Alternatively, in other embodiments, item images that may be presented according to the systems and methods described herein may include advertisements, images in news articles, editorial content, videos, classified listings, auction listings and/or any other content that may be electronically presented to a user. As used herein, the term "item," in addition to having its ordinary meaning, is used interchangeably to refer to an item itself (e.g., a particular product and/or object) and to its description or representation in a computer system or electronic catalog. As will be apparent from the context in which it is used, the term is also sometimes used herein to refer only to the item itself or only to its representation in the computer system.

Turning now to FIG. 1, the figure illustrates a block diagram of an example operating environment 100 that includes a keyword service 110 to determine data based at least in part on a keyword associated with one or more color palettes. In some embodiments, the operating environment 100 includes the keyword service 110, a palette service 112, a color naming service 114, an image service 116, an affiliated color service 122, a palette data store 118, an item data store 150, a network 120, color data providers 130, and user computing devices 102. In some embodiments, various components of the operating environment 100 are communicatively interconnected with one another via the network 120. The operating environment 100 may include different components, additional components, fewer components, or can be structured differently. For example, there can be one or more data stores or other computing devices in connection with the keyword service 110. As another example, components of the operating environment 100 may communicate with one another with or without the network 120. Those skilled in the art will recognize that the user computing devices 102 may be any of a number of computing devices that are capable of communicating over a network including, but not limited to, a laptop, personal computer, personal digital assistant (PDA), hybrid PDA/mobile phone, mobile phone, smartphone, electronic book reader, wearable computing device, digital media player, tablet computer, gaming console or controller, kiosk, augmented reality device, other wireless device, set-top or other television box, and the like.

The keyword service 110 can correspond to any system capable of performing the processes described herein. For example, the processes associated with palette service 112, color naming service 114, image service 116, and/or affiliated color service 122 may be performed by the keyword service and, therefore, separate services may be unnecessary. The keyword service 110 or other services may be implemented by one or more computing devices. For example, the keyword service 110 may be implemented by computing devices that include one or more processors to execute one or more instructions, memory, and communication devices to transmit and receive data over the network 120. In some embodiments, the keyword service 110 is implemented on one or more backend servers capable of communicating over a network. In other embodiments, the keyword service 110 is implemented by one or more virtual machines in a hosted computing environment (e.g., a "cloud computing environment"). The hosted computing environment may include one or more provisioned and released computing resources, which computing resources may include computing, networking or storage devices.

In some aspects, the keyword service 110 can correspond to one or more applications that perform, individually or in combination, the image, data, and/or color identification functions described herein, including determining data from keyword searching of color palettes, determining affiliated color palettes associated with keyword searching of color palettes, retrieving color names associated with color palettes, retrieving color palettes based on historical trend data, or the like and/or some combination thereof. In certain aspects, the keyword service 110, the palette service 112, and/or the affiliated color service 122 may be configured to store or update palettes at the palette data store 118. In some embodiments, the keyword service 110 is associated with a network or network-based merchandise provider, vendor and/or other parties.

In some embodiments, each of the palette data store 118 and/or item data store 150 may be local to the keyword service 110, may be remote from the keyword service 110, and/or may be a network-based service itself. The palette data store 118 and/or item data store 150 may be embodied in hard disk drives, solid state memories, any other type of non-transitory computer-readable storage medium, and/or a file, a database, a relational database, in-memory cache, and/or stored in any such non-transitory computer-readable medium. The palette data store 118 and/or item data store 150 may also be distributed or partitioned across multiple local and/or storage devices without departing from the spirit and scope of the present disclosure. The palette data stored in the palette data store 118 can be collections of colors generated by a user or system based at least in part on human color preferences. Palette data can be of various formats, such as lists, integers, hexadecimal format, vectors, arrays, matrices, etc. Metadata can be associated with individual palettes, for purposes of indicating their format, tags, associations, popularity, date(s)/time(s) of creation/editing, geolocation data, last update time, semantics, features, conditions, associated demographics (e.g., geographical region, age, gender, ethnic group, religion, culture, language, dialect, etc. of users that provided input used in creating the palette), or the like. In some embodiments, the palette data store 118 and/or some other data store may store data associated with color names of individual colors and/or metadata associated with color names. Metadata associated with color names and/or search phrases may be similar to the metadata associated with color palettes (e.g., tags, popularity, time of creation, geolocation data, localization and/or internationalization data, last update time, semantics, features, conditions, and/or associated demographics of their respective creators, etc.).

The image service 116 (or any other service) may be connected to and/or in communication with an item data store 150 that stores images, item information, metadata, and/or attributes regarding a number of items, such as items listed in an electronic catalog as available for browse and/or purchase. Item data stored in item data store 150 may include any information related to each item. For example, item data may include, but is not limited to, price, availability, title, item identifier, item images, item description, item attributes, keywords associated with the item, etc. In some embodiments, the item data store 150 may store digital content items (e.g., audiobooks, electronic books, music, movies, multimedia works, etc.). By way of further example, the item metadata may indicate the item type and/or category, such as "dress" and "clothing," or "blender" and "kitchen appliance." A retail server may also be connected to or in communication with a user data store (not illustrated) that stores user data associated with users of the retail server, such as account information, purchase history, browsing history, item reviews and ratings, personal information, user preferences, location information, etc. In some embodiments, data associated with a user data store is stored in the item data store 150. For example, item search results or item recommendations may be filtered and/or ranked based on purchase history data. The image service 116 and/or the keyword service 110 may be connected to and/or in communication with the item data store 150 that may be used to store one or more images associated with each of the number of items that can be displayed to represent the item in search results or the like. Multiple images can be associated with an item, for instance to aid a user in a purchase decision regarding the item.

The network 120 may include any suitable combination of networking hardware and protocols necessary to establish communications within the operating environment 100. For example, the network 120 may include private networks such as local area networks (LANs) or wide area networks (WANs) as well as public or private wireless networks, satellite networks, cable networks, cellular networks, or the Internet. In such embodiments, the network 120 may include hardware (e.g., modems, routers, switches, load balancers, proxy servers, etc.) and/or software (e.g., protocol stacks, accounting software, firewall/security software, etc.) that establish networking links within the operating environment 100. Additionally, the network 120 may implement one of various communication protocols for transmitting data between components of the operating environment 100.

The color data providers 130 may correspond to hosts of databases and/or data stores of color palettes, color names, color surveys, or the like. The color palettes being ranked, rated, and/or voted on by a community of people associated with the color data providers 130. The various hosts can include, for example and without limitation, hosts of an artistic network site, electronic commerce site, merchandise providers or vendors, survey of the general population, designers, photographers, artists, social network sites, or the like. In some embodiments, the various color data providers 130 are associated with a particular community of people such as artists, designers, photographers, cinematographers, fashion experts, critics, or the like. In certain embodiments, the color data providers 130 are accessible by the public in general such that the associated color palettes are ranked, rated, or voted on by people that do not necessarily belong to any particular community or group.

The color data providers 130 can create and/or curate color combinations based on the preferences of each provider's community of users. Particular color data providers 130 may be associated with a particular community, which includes a biased population. This may allow for the keyword service 110 to retrieve palettes with a known and/or desired bias depending at least in part on the use of the retrieved palettes. This may also allow for the keyword service 110 to reduce or remove the bias present in different communities by combining palettes from a plurality of communities of users.

The color data providers 130 can be associated with any computing device(s) that can facilitate communication with the image processing service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

One skilled in the relevant art will appreciate that the components and configurations provided in FIG. 1 are illustrative in nature. Accordingly, additional or alternative components and/or configurations, especially regarding the additional components, systems and subsystems for facilitating functions disclosed herein may be utilized.

Figure 2:
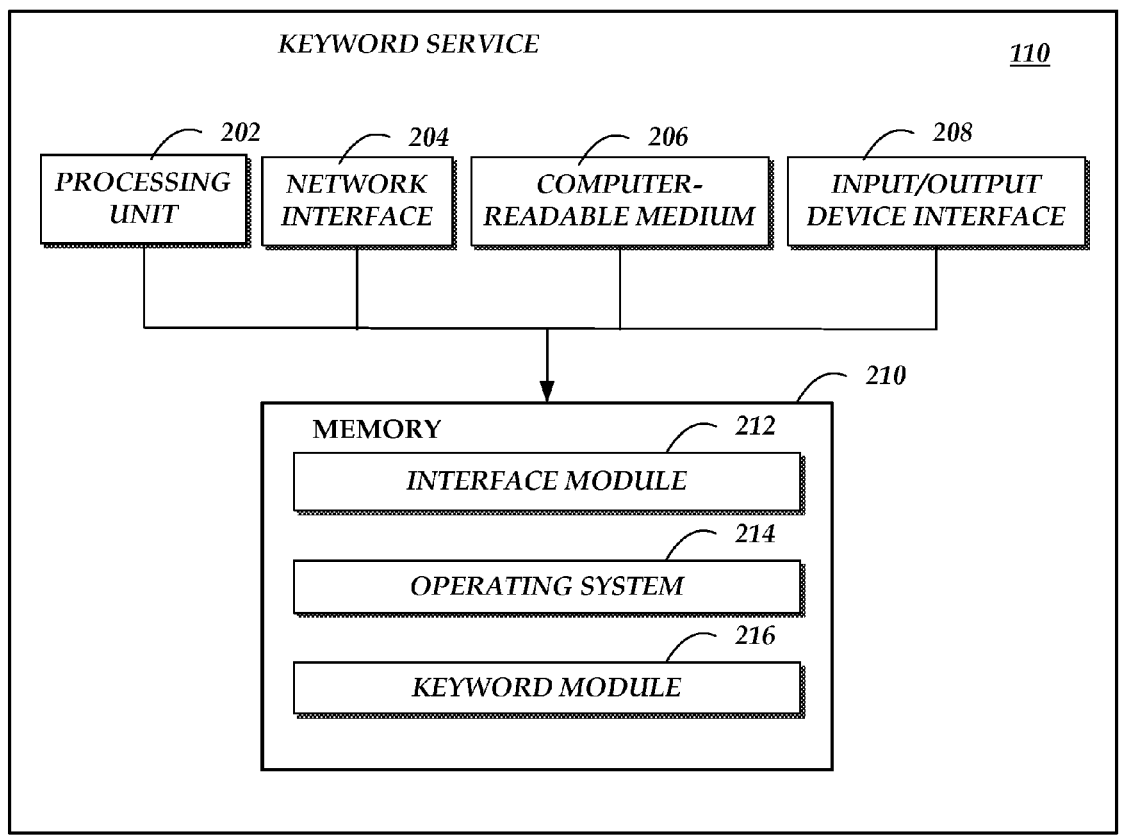
FIG. 2 depicts a general architecture of a computing device providing a keyword service used in accordance with the operating environment of FIG. 1.

FIG. 2 illustrates a block diagram of example components of a computing system capable of implementing a keyword service 110 utilized in accordance with the operating environment 100 of FIG. 1. The example computing system includes an arrangement of computer hardware and/or software components that may be used to implement aspects of the present disclosure. Those skilled in the art will appreciate that the computing system may include different components (e.g., more or fewer components) than those depicted in FIG. 2. Those skilled in the art will also appreciate that not all of these generally conventional components have been shown but are understood to be present to enable the functionality and processes described herein.

The computing system may include a processing unit 202, a network interface 204, a non-transitory computer-readable medium 206, and an input/output device interface 208, all of which may communicate with one another by way of a communication bus. The network interface 204 may provide the keyword service 110 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more processes described herein. The memory 210 generally includes RAM, ROM, and/or other persistent or non-transitory computer-readable storage media. The memory 210 may store an operating system 214 that provides computer program instructions for use by the processing unit 202 in the general administration and operation of the keyword service 110. The memory 210 may further include other information for implementing aspects of the present disclosure.

In some embodiments, the memory 210 includes an interface module 212. The interface module 212 can be configured to facilitate generating one or more user interfaces through which a user computing device 102, may interact with the keyword service 110 to access related image-data, item data, color palettes, affiliated colors, etc. Specifically, the interface module 212 can be configured to generate user interfaces for receiving keywords, outputting images, data, colors, color names, items, and/or color palettes. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a keyword module 216 that may be executed by the processing unit 202. In some embodiments, the keyword module 216 implements aspects of the present disclosure. For example, the keyword module 216 can be configured to process keyword data, color data, instructions, or metadata. Specifically, the keyword module 216 can be configured to perform functions described herein, such as determining data from keyword searching of color palettes, determining affiliated color palettes associated with keyword searching of color palettes, retrieving color names associated with color palettes, retrieving color palettes based on historical trend data, or the like.

It should be noted that the keyword service 110 may be implemented by some or all of the components present in the computing system as discussed herein with respect to FIG. 2. In addition, the keyword service 110 may include additional components not present in FIG. 2. In addition, the computing system described above may also include additional modules or be implemented by computing devices that may not be depicted in FIG. 1 or 2. For example, although the interface module 212 and the keyword module 216 are identified in FIG. 2 as single modules, one skilled in the relevant art will appreciate that the modules may be implemented by two or more modules and in a distributed manner. As another example, the computing system and its components can be implemented by network servers, application servers, database servers, combinations of the same, or the like, configured to facilitate data transmission to and from color data providers 130 or user computing devices 102 via network 120. Accordingly, the depictions of the modules are illustrative in nature. It will also be appreciated that, in some embodiments, a user device may implement functionality that is otherwise described herein as being implemented by the elements and/or modules of the computing system implementing the keyword service 110. For example, the user computing device 102 may receive code modules or other instructions from the computing system implementing the keyword service 110 via the network 120 that are executed by the user computing device 102 to implement various aspects of the present disclosure.

Example Process to Search Color Palettes Using Keywords to Retrieve Data

Figure 3:
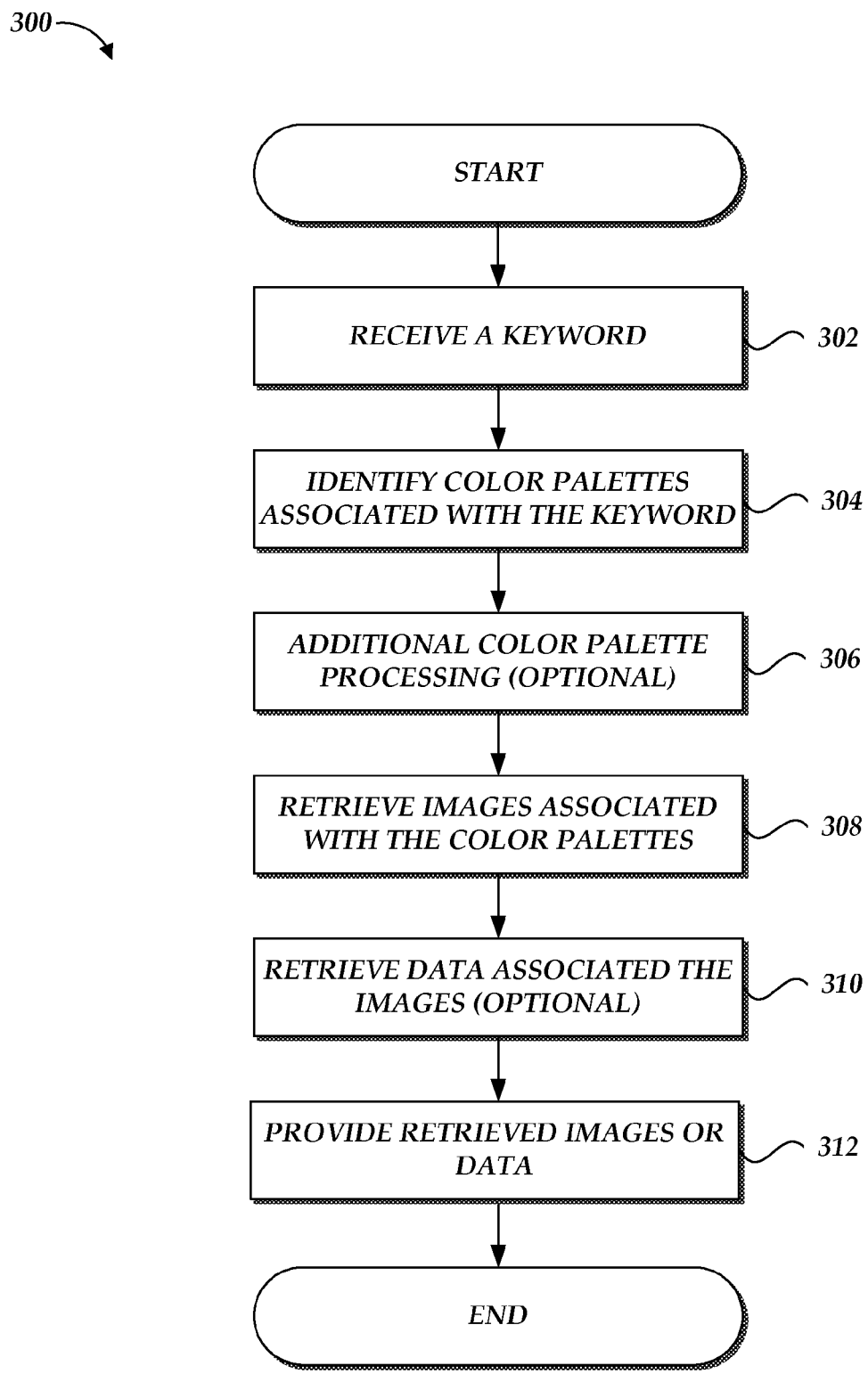
FIG. 3 is a flow diagram of an illustrative method implemented at least in part by a keyword service for determining data based on keyword searches of one or more color palettes.

FIG. 3 is a flow diagram of an illustrative method 300 implemented at least in part by the keyword service 110 identifying image or other data based on a keyword associated with one or more color palettes. While the illustrative method will be described below as being implemented by the components of keyword service 110, in other embodiments, a similar method may be implemented by a computing system responsible for providing front-end communication with a user computing device. As discussed above, illustrative method 300 may be implemented entirely by a user device, such as user computing device 102, in some embodiments.

The illustrative method 300 begins at block 302, where the keyword service 110 may receive a keyword and/or phrase. The received keyword and/or phrase of words may be received via user input or automated input. User input may be received in multiple formats, such as a search string, word, phrase, alphanumeric string, symbol(s), and/or audio input of a word or phrase. A non-color keyword may be received that may be suggestive of one or more colors (e.g., summery, sunny, mellow, dressy, holiday, Halloween, Christmas, Chanukah, sports team name, etc.). Automated input may include textual words associated with audio content, a song, an e-book, and/or data associated with an upcoming holiday and/or season such as fall. Other automated input data may include trending data based on geo-location searches. A particular search phrase may be popular within a particular area and/or region, for example the phrase "Super Bowl" near the time and city of its location, which may be used as input for the illustrative method 300.

At block 304, the keyword service 110 and/or palette service 112 identifies color palettes associated with the received keyword and/or phrase. A color palette may be associated with a name, tags, and/or any other metadata. The characteristics, properties, attributes, and/or other metadata associated with color palettes are discussed in further detail with reference to FIGS. 5 and 8A-B. For example, as described herein, color palettes and/or other metadata associated with color palettes may be generated by humans. The keyword service may identify one or more color palettes from the palette data store based on the keyword using search algorithms including search string algorithms, partial matching of complete strings and/or words, search engine algorithms, natural language searching, state machines such as deterministic finite automatons or nondeterministic finite automatons, fuzzy searching, machine learning, neural networks, or the like and/or some combination thereof. For example, a keyword and/or phrase may include the word "fire." In the example, the keyword service may match color palettes having names such as "fire night," "firestorm," "firestarter," or the like. The keyword search may also match color palettes based on tags, metadata, and/or some other data such as a data store of related words. Thus, a search on the keyword "fire" may return color palettes with names such as "sun," "spicy," "inferno," etc.

At block 306, the keyword service 110 and/or some other service may perform additional color palette processing. Additional color palette processing may include retrieving the color palettes from the palette data store or other additional data retrieval, which is discussed in further detail with reference to FIG. 4.

At block 308, the keyword service 110 and/or the image service 116 retrieves images associated with one or more color palettes. Each color palette may comprise one or more colors, which may be used as input colors for retrieving images. Images may be retrieved from the item data store based at least in part on the one more input colors from the color palettes. It may be difficult and/or computationally expensive to retrieve images, such as clothing or other items, by a specific color (e.g., a specific RGB color or a RGB color range). For example, searching by color in a structured data store can be challenging due to the multidimensional nature of colors. Thus, the keyword service and/or the image service may retrieve images using fast color indexing and/or searching, as described in U.S. patent application Ser. No. 14/315,700, entitled "FAST COLOR SEARCHING," filed on Jun. 26, 2014, which is incorporated by reference herein in its entirety. In some data stores, items may not contain color information and/or items may be manually categorized by color into broad categories of a few colors. Thus, colors can be extracted from an image, such as an image provided by a user or an image of an item in an item catalog or on a network site, as described in U.S. patent application Ser. No. 14/316,483, entitled "IMAGE-BASED COLOR PALETTE GENERATION," filed on Jun. 26, 2014, which is incorporated by reference herein in its entirety. Matching colors from the retrieved color palettes to the colors of images can also include determining a threshold and/or color range within which a color will be considered to be the same as, or sufficiently similar to, the input color. The threshold can be based on color distance according to a color distance formula(e). An example of such a formula is one based on a human perceptible color difference. Examples and/or techniques regarding human perceptible color difference and the human color distance formula are discussed in further detail in U.S. patent application Ser. No. 14/315,700, entitled "FAST COLOR SEARCHING," filed on Jun. 26, 2014, and/or U.S. patent application Ser. No. 14/316,483, entitled "IMAGE-BASED COLOR PALETTE GENERATION," filed on Jun. 26, 2014. In this manner, in some embodiments, images may be retrieved that include colors that are not identical to the input color, but that include colors which are sufficiently close to the input color are included in the search results.

At block 310, the keyword service 110 and/or the image service 116 may optionally retrieve data associated with the retrieved images. As previously discussed, in an electronic commerce context, the item data store 150 may contain item data including, but not limited to, price, availability, title, item identifier, item description, etc., which may be of interest and/or returned to the user. In some embodiments, other data and/or metadata associated with the images may be returned, such as the time of the image (e.g., photograph, video, etc.), location of the image, or other data associated with the image.

At block 312, the keyword service 110 may provide and/or output the retrieved images and/or data. In an electronic commerce example, where a user has searched for "fiery" or based on some other input, the keyword service 110 may have identified one or more color palettes and images associated with those one or more color palettes to be presented to the user computing device or provided to an electronic commerce server. In some embodiments, a benefit of searching human generated color palettes by keywords associated with a name and/or other metadata associated with a color palette is that searching by non-color terms, which are still highly suggestive of color, may yield an accurate and/or wide range of color palettes and/or colors.

The foregoing process may be similarly used by a merchandiser and/or a maintainer of an electronic marketplace in assembling sets of items, such as clothing items, from one or more catalogs of items. For example, the catalog of items may be stored in one or more electronic catalog data stores, such as item data store 150. A merchandiser may search on a phrase such as "baby blue" or "Monday." The merchandiser may optionally specify that items in affiliated colors may be included in the outfit. The example process 300 may then generate one or more recommended outfits and/or items as similarly discussed above with respect to identifying images and/or items associated with color palettes. The merchandiser may select one or more of the presented outfits and cause a record to be stored, for later access, of the outfits including identifiers associated with each item included in a given outfit and a respective same outfit. Multiple outfits may be grouped as a collection. The merchandiser may then instruct that one or more of the outfits, as selected by the merchandiser, or the collection as a whole, be published on a commerce marketplace or elsewhere to enable consumer access and purchase. The merchandiser may also instruct that one or more of the outfits, as selected by the merchandiser, or the collection as a whole, be published as an advertisement on one more sites or other advertising channels. Thus, searching by keywords and/or search phrases to identify and/or determine one or more color palettes and/or colors, may be used to determine color coordinated collections associated with those keywords and/or search phrases.

Example Process for Additional Color Palette Processing

Figure 4:
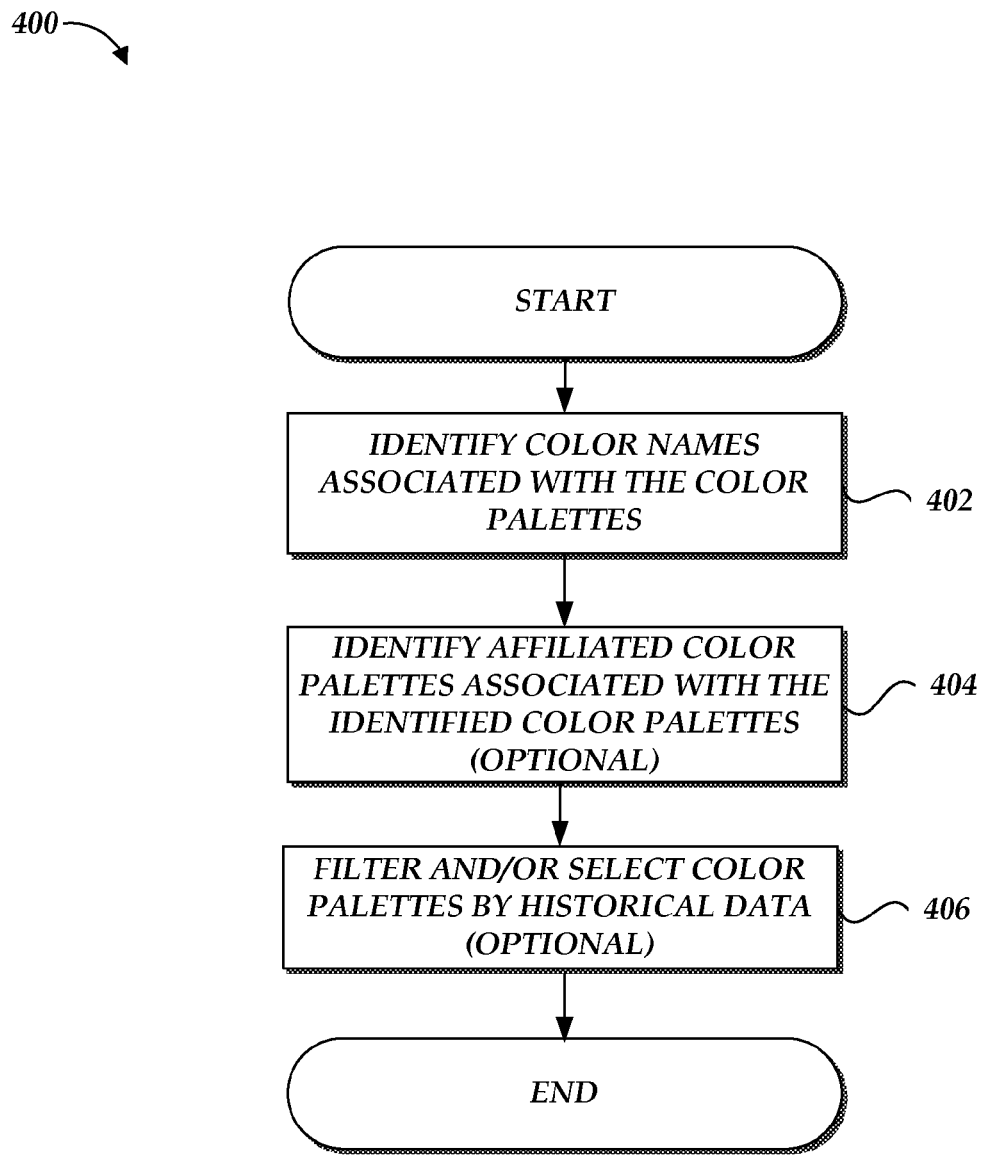
FIG. 4 is a flow diagram of an illustrative method implemented at least in part by a keyword service for additional color palette processing.

FIG. 4 is a flow diagram of an illustrative method 400 implemented at least in part by the keyword service 110 or other services for additional color palette processing. The color palettes that may be additionally processed may have been identified based on an association with the keyword, as described above with reference to block 304 and/or illustrative method 300. While the illustrative method 400 will be described below as being implemented by the components of keyword service 110 or other services, in other embodiments, a similar method may be implemented by a computing system responsible for providing front-end communication with a user computing device. As discussed above, illustrative method 400 may be implemented entirely by a user device, such as user computing device 102, in some embodiments.

The illustrative method 400 begins at block 402, where keyword service 110 and/or the color naming service 114 identify color names associated with the one or more colors of color palettes. As described above, one or more surveys and/or color data providers 130 may provide color data such as a human survey of color names and/or human generated data of color names. For example, one or more color data providers 130 may have surveyed hundreds of thousands of users to name millions of colors. The color names from a human color survey may be richer and/or more accurate than standard color naming data stores and/or data sources. For example, color names based on a color survey may include names that are not typical color names, but that are highly suggestive of color, such as "lime," "asparagus," or the like. The data from such a survey may be stored in the palette data store 118. A color naming service 114 and/or some other service may use fast color searching techniques, as described in application U.S. patent application Ser. No. 14/315,700, entitled "FAST COLOR SEARCHING," filed on Jun. 26, 2014, to retrieve names for one or more colors of color palettes. In some embodiments, color names may be retrieved by the color naming service 114 from the palette data store 118 or some other data store. Additionally or alternatively, similar to the described above techniques for determining images within a color range of an input color, a color name associated with a color may be determined based at least in part on a color range within a color space. Color names may be presented to the user in combination with presented items and/or images. In some embodiments, color names may be used in any other manner such as validating pre-existing color names of items and/or item images, as described in U.S. patent application Ser. No. 14/315,932, entitled "AUTOMATIC COLOR VALIDATION OF IMAGE METADATA," filed on Jun. 26, 2014, which is incorporated by reference herein in its entirety. In some embodiments, historical data regarding color names may be stored and used similar to the trending patterns that are described with reference to FIGS. 8A-B and 9. For example, color name data may be associated with votes and/or time properties to determine trending and/or popular color names.

In some embodiments, color names may be associated with metadata and/or additional data may be determined associated with the color names. For example, a color name of "manatee" may be associated with a description, type, and/or category such as "animal," "sea animal," "mammal," "exotic animal," or the like. In some embodiments, data associated with color names may be determined based at least in part on natural language processing, linguistic techniques, machine learning, artificial intelligence, or other known techniques for dynamically determining additional data associated with words and/or phrases. The color naming service 114 may use the metadata associated with color names to select and/or prioritize color names. For example, color names associated with an animal name (or particular animal names) may be excluded in a clothing context. Additionally and/or alternatively, color naming rules, business rules, and/or logic may be used to select color names. In some embodiments, the rules may be implemented in code (e.g., JAVASCRIPT®, JAVA®, C#, or the like) and/or based on data (e.g., Extensible Markup Language ("XML"), JavaScript Object Notation ("JSON"), records from a data store, or the like). For example, rules may be applied to filter any color name associated with an animal name, bodily function (e.g., "vomit"), or any offensive term and/or phrase. In some embodiments, the color names from a color survey may be associated with ranking and/or voting data indicating human preferences for color names. For example, out of thousands of survey participants, the color name "lime" may receive the highest votes for a particular RGB color and/or value. Thus, the color naming service 114 may return a color name with the highest ranking and/or voting data associated with a particular color. In some embodiments, there may be more than one color name associated with a particular color. In some embodiments, selection of color names may be based on demographic data associated with the color names. For example, one or more color names for men's clothing in a particular color may be different than the one or more color names for women's clothing for the same color because human color surveys may indicate that men and women perceive the same colors differently. Selections of color names may be based on regional and/or cultural differences in the perception(s) of colors. For example, the same color may have two different color names in different regions of the world (e.g., a color may be named "bluish" in Western countries and "greenish" in Eastern countries). In other words, the color names associated with particular colors and/or sets of colors may be localized and/or customized to the regional and/or cultural preferences of color names based on metadata and/or color survey data. In some embodiments, localization and/or internalization of color names may include translating one or more color names into the respective language of a particular user.

At block 404, the keyword service 110 and/or the affiliated color 122 service may optionally identify affiliated color palettes associated with the previously identified color palettes. As used herein, "affiliated color" and/or "affiliated color palettes" refer to colors associated with an initial color or colors based at least in part on human color preferences and/or data store of color palettes. For example, a color palette may include one or more input colors. The one or more input colors of the color palette may be included in other color palettes and, therefore, the other color palettes and/or their colors may be affiliated with the one or more input colors. The affiliated color techniques may be used to generate a color palette based at least in part on an input color or colors and/or identifying related color palettes to an input color or colors. More information regarding generating affiliated colors may be found in U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety.

The affiliated colors and/or color palettes associated with the one or more input colors may be based at least in part on weighting and/or rank data provided by the color data providers 130. For example, one or more color palettes may have been voted on, ranked, and/or rated, as described in further detail with reference to FIGS. 8A-B. In some embodiments, adjusting the weight of the color includes scaling the ranking, rating, and/or number of votes based at least in part on a number of factors, which can include which users voted on the palette, the age of the palette, the number of comments on the palette, and the like. Thus, a preferred, ranked, and/or highest-ranked list of affiliated colors may be generated based on ranking data and/or votes by humans. Generation of affiliated colors may be further based on weighting data. Where a color appears in more than one palette, the weight of that color is the combination of the weights derived from each originating palette. As an example of a simple case, where a color appears in three palettes, the weight of that color can be equal to the sum of the votes of each of the three palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette). The weights of each color may be tallied and provided in an ordered or ranked list of affiliated colors, where the rank of an affiliated color is based at least in part on the relative weight of the color. The keyword service 110 can take a subset of the ordered list of affiliated colors based at least in part on a desired, targeted, and/or threshold number of colors to include in the list, a threshold weight factor to include in the list, a variety of colors in the list, or the like.

In some embodiments, affiliated color palettes may be generated. For example, a first color can be selected from a determined and/or searched color palette. The first color may be present in other related color palettes. A list of affiliated colors can be generated by identifying the other colors in the palettes. For each affiliated color in the list, a weight can be assigned based on the ranking, rating, and/or number of votes the containing palette has received. The list of affiliated colors can be sorted based on the assigned weights. The keyword service 110 and/or affiliated color service 122 can select an affiliated color from the sorted list to add to a generated affiliated color palette containing the initial color. When the selected affiliated color is added to the palette, a new list of affiliated colors can be generated based at least in part on the colors in the palette, which allows the affiliated color service to continue to build the color palette. A threshold of colors may be used by the affiliated color service to stop adding colors to the generated affiliated color palette.

In some embodiments, there may be various uses of determining affiliated colors or color palettes. For example, in a merchandiser and/or electronic commerce use case, upon searching a keyword or automated input, a user may receive a list of images and/or items based on determined one or more color palettes and/or one or more affiliated color palettes. Thus, a user may be presented with one or more color palettes based on weighting and/or ranking data that enhances the commerce, curation, and/or merchandising experience (such as by providing recommendations of items). For example, the user may be exposed to a wide range of images, and/or items associated with color palettes than would otherwise be possible without the use of affiliated color palettes. User interface embodiments related to electronic commerce are described in further detail with reference to FIG. 6. In a visualization example, mood and/or setting colors or images including certain colors may be surfaced and/or presented to a user based on affiliated colors or color palettes. User interface embodiments related to various color visualizations are described in further detail with reference to FIGS. 7A-B.

At block 406, the keyword service 110 or the palette service 112 may optionally rank, select, and/or filter color palettes based on historical data. As described above and below with reference to FIGS. 8A-B and/or 9 the palette data store 118 and/or one or more color data providers 130 may store data related to votes, rankings, data entry, changes of color palettes, and/or other metadata associated with color palettes. The keyword service 110 may access historical data associated with the color palettes. For example, color palettes may be ordered and/or ranked by date of creation. Thus, the keyword service 110 may include logic and/or preferences to retrieve the newest color palettes within a time threshold. In other words, priority color palettes may be selected based on a time property and/or value associated with color palettes. In some embodiments, the keyword service may return color palettes of a particular date range. For example, for a Halloween time period, color palettes may be returned that have a creation date nearest to October. Access to historical data may also allow the identification of trending patterns associated with particular keyword searches, popularity of color palettes, changes of color palettes over time, and/or trends of any other data associated with color palettes. For example, historical data may be used to determine attitudes and perceptions of colors, and what colors coordinate with what colors, which may change over time. Historical data and/or trends associated with color palettes are discussed in further detail with reference to FIGS. 8A-B and/or 9. Thus, ranking of color palettes may be used in association with color user interfaces and/or visualizations based on keyword and/or automated input searching of color palettes.

In some embodiments, the keyword service 110 may filter and/or select color palettes by keyword and/or search phrase history associated with one or more color palettes. Filtering and/or selection of color palettes may be accomplished by accessing historical data associated with keywords and/or color palettes from the palette data store 118. The keyword service 110 and/or some other service may determine trending and/or historical patterns based on keywords and/or search phrases. For example, a keyword and/or search phrase, such as "summery," may be associated with one or more colors and/or color palettes at a particular time. At a later time, the colors and/or color palettes associated with the keyword and/or search phrase "summery" may have changed. Thus, the keyword service 110 may determine trending and/or historical patterns associated with particular keywords and/or search phrases. In the keyword "summery" example, colors and/or color palettes associated with the keyword "summery" may be trending towards light blue colors at one time, whereas in the previous year the keyword "summery" may have been associated with another color such as pink. Thus, the keyword service 110 may filter color palettes based on trends associated with keyword searches by favoring and/or preferring trending colors and/or color palette patterns. In another example, the keyword service 110 may determine color palettes associated with a search phrase based on a more recent time of creation of the color palettes and/or for color palettes created within a threshold period of time, e.g., within the last year. In some embodiments, historical data associated with color palettes may be used to predict future color trends. Historical data associated with keyword searches is discussed in further detail with reference to FIG. 9.

Example Color Palettes

Figure 5:
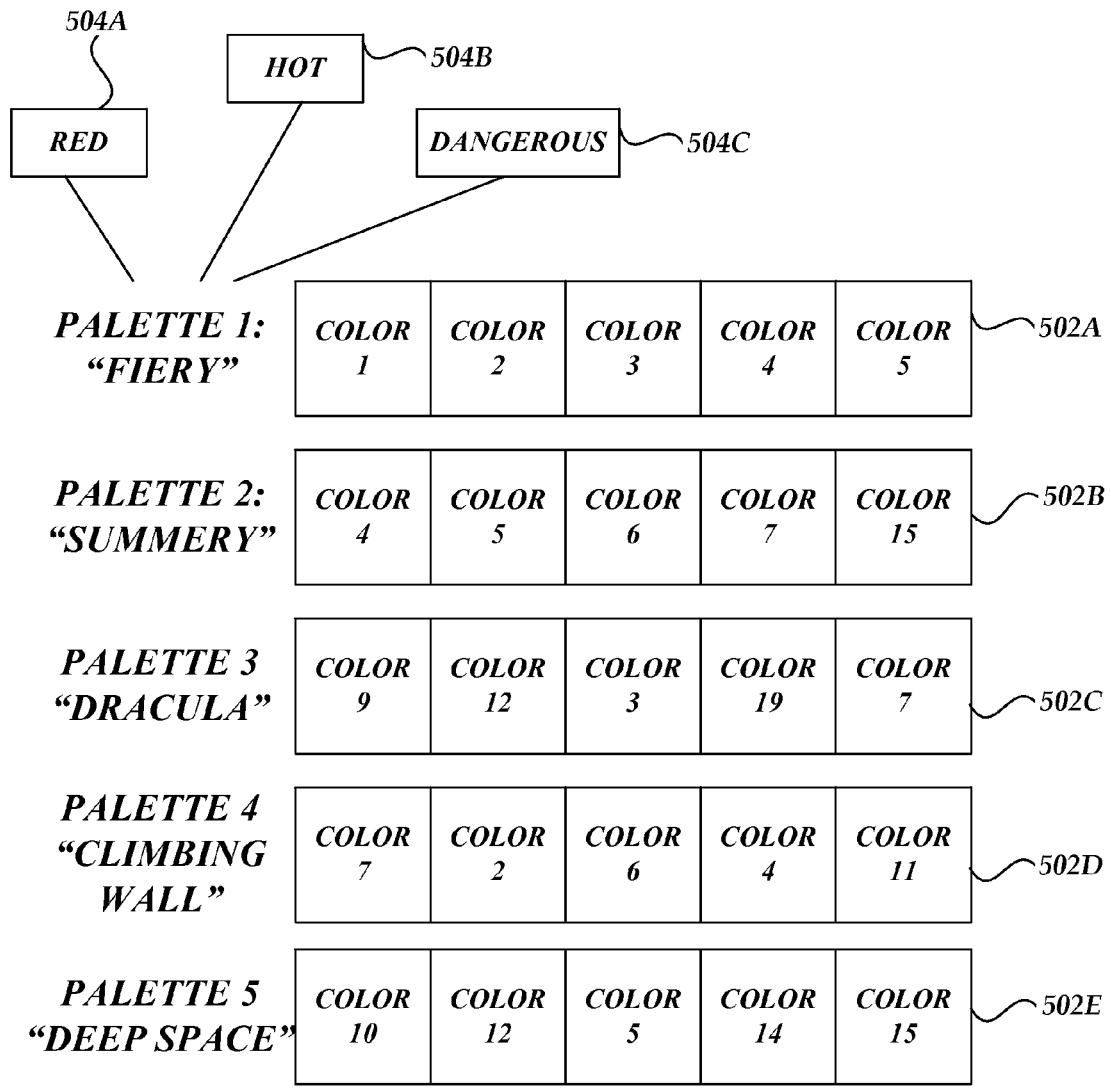
FIG. 5 illustrates example color palettes including colors and a palette name.

FIG. 5 illustrates example color palettes 502A-E retrieved by the example method 300 of FIG. 3. The color palettes 502A-E can be from a data store of human or machine-created color palettes. Each of the color palettes 502A-E include one or more colors and a name for the color palette. As described above, a name of the color palette or other data associated with the color palette may be used for searching. For example, the names "fiery," "summery," "Dracula," "climbing wall," and "deep space," may be associated with color palettes 502A, 502B, 502C, 502D, and 502E, respectively. In some embodiments, humans may assign and/or create names for color palettes.

Each color palette may be associated with one or more tags. For example, the color palette 502A, "fiery," may be associated with one or more tags including "red," "hot," and/or "dangerous" tags 504A-C. The tags may be human generated, generated by a computer system and/or some combination thereof. For example, when a human creates a color palette, the creator may associate one or more tags with the color palette. As described above, tags may be used for searching color palettes as well. In some embodiments, tagging of color palettes may be wholly or partially automated. For example, a word data store, such as a data store of synonyms, may be used to automatically tag color palettes with synonym tags based on one or more words of a color palette name. For example, synonym tags of the word "fiery" may include "flaming," "hot," or other words of the like.

In some embodiments, the colors identified in color palettes may be provided in various representations and/or formats. For example, colors 1-5 of color palette 502A may be represented by 3-dimensional RGB colors in the palette data store 118. For example, color 1 may have an RGB value (e.g., #c108e5 in hex) that includes three dimensions: the red dimension ("c1"), the green dimension ("08"), and the blue dimension ("e5"). As described above, the colors identified in color palettes may be searched efficiently using fast color search techniques as described in U.S. patent application Ser. No. 14/315,700, entitled "FAST COLOR SEARCHING," filed on Jun. 26, 2014. In some embodiments, color palettes may include any number of colors.

Example User Interfaces

Figure 6:
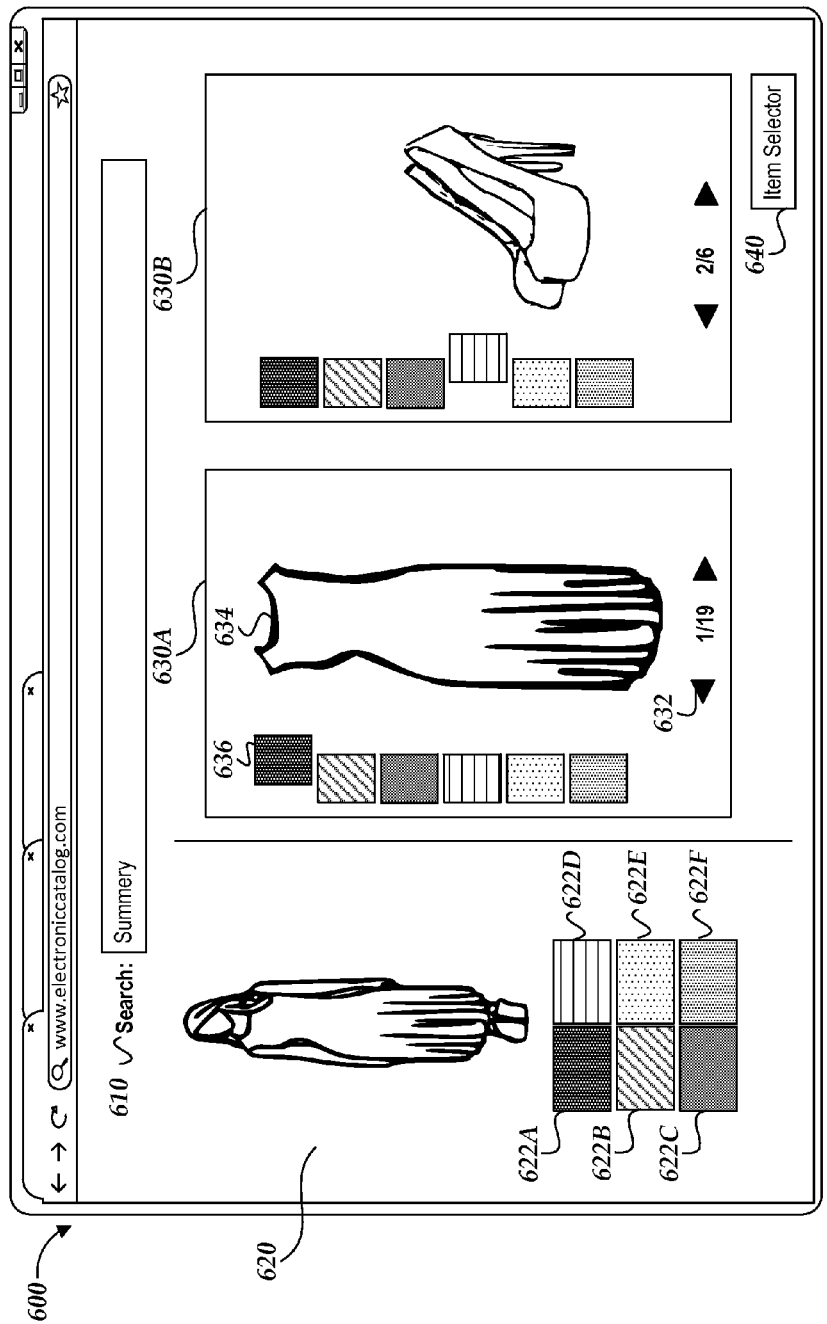
FIG. 6 is an illustrative user interface generated at least in part by a keyword service that includes an interactive configuration of images and color palettes that can be searched by keyword, according to some embodiments.

FIG. 6 is an illustrative user interface 600 generated at least in part by the keyword service 110 that includes a search section 610, a color palette section 620, item sections 630A-B, and an item selector 640. Illustrative user interface 600 may allow a user, such as a customer and/or merchandiser, to search for color palettes by keywords, view matching color palettes, and select items associated with colors of the color palettes. For example, user interface 600 may allow a merchandiser for an electronic retailer to curate a collection for an electronic catalog. As described below, many elements and/or features of the user interface 600 may be provided and/or implemented by the keyword service 110 and/or some other service with reference to illustrative method 300. It will be appreciated that while embodiments herein are often described with respect to clothing, this is for illustrative purposes and is not meant to limit the scope of the presentation or searching techniques described herein, which can be used to accommodate other types of images and items as well. For example, collections of interior decoration, furniture, car styling, paint schemes, to name a few, could also benefit from the efficient data and/or color palette searching discussed herein.

As illustrated, a user may enter a keyword and/or search word or words into search section 610, here "summery." The keyword service 110 may receive the search word and return one or more color palettes in the color palette section 620 based at least in part on the search word. The provided color palette may include colors 622A-F. The user interface may provide item section 630A and item section 630B to allow a user to select one or more items that have colors 622A-F. For example, items presented in section 630A and 630B may have been determined and/or returned by the keyword service 110 from the item data store by matching the one or more colors 622A-F. In some embodiments, as illustrated in item section 630A, a user may select a color selector 636 of the color palette to preview the item 634 in the particular color, here color 622A. Navigation selector 632 of the item section 630A may allow a user to navigate through different items and/or styles associated with the item. For example, a user may navigate with navigation selector 632 to view nineteen different dresses of and/or sufficiently close to the selected color. In some embodiments, the items presented may be filtered and/or ranked based on trending data such as purchase history data, popular keyword searches, and/or items associated with popular color palettes.

In some embodiments, the user interface allows selection of other items. Item selector 640 may allow a user to select additional items. For example, upon selecting item selector 640, a user may be visually presented with different types of items for future selection. In the illustrated clothing example, additional items may include watches, accessories, boots, shirts, pants, jackets, and/or other items not currently presented. Similar to item section 630A or item section 630B, an additional item section may be presented in the user for selecting items of one of the colors 622A-F. As a result, a user may be able to assemble a collection of items of colors corresponding to a color palette search result. In some embodiments, color names may be presented to the user with reference to colors 622A-F.

In other embodiments, a user may search a personal data store of images based on keyword searches associated with colors of the images. For example, where a user searches "fiery," color palettes may be retrieved matching that keyword. Images from a library and/or data store may be retrieved that are associated with the one or more colors from the color palettes. For example, images in a photography library may correspond to color photographs of persons, buildings, places, and/or objects in the world. Using the systems or techniques described in U.S. patent application Ser. No. 14/316,483, entitled "IMAGE-BASED COLOR PALETTE GENERATION," filed on Jun. 26, 2014, colors may be extracted from images, such as photographs of friends in social settings, such that the images may have representative one or more colors extracted from the images that may be used for keyword searching of color palettes.

Figure 7A:
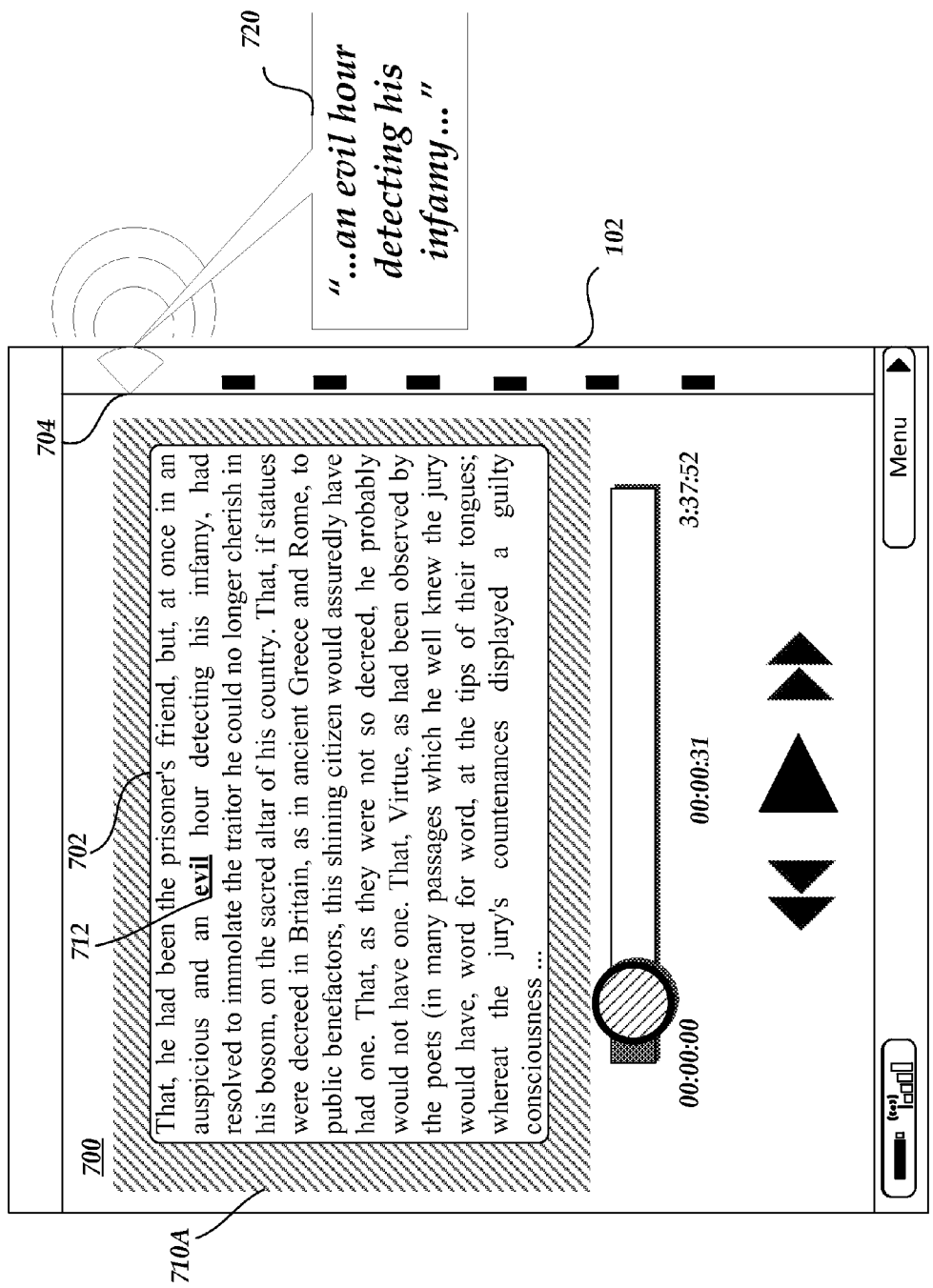
FIGS. 7A-B illustrate an example sequence of user interface representations illustrating color visualizations based on keywords related to color palettes of audio and/or text content, according to some embodiments.
Figure 7B:
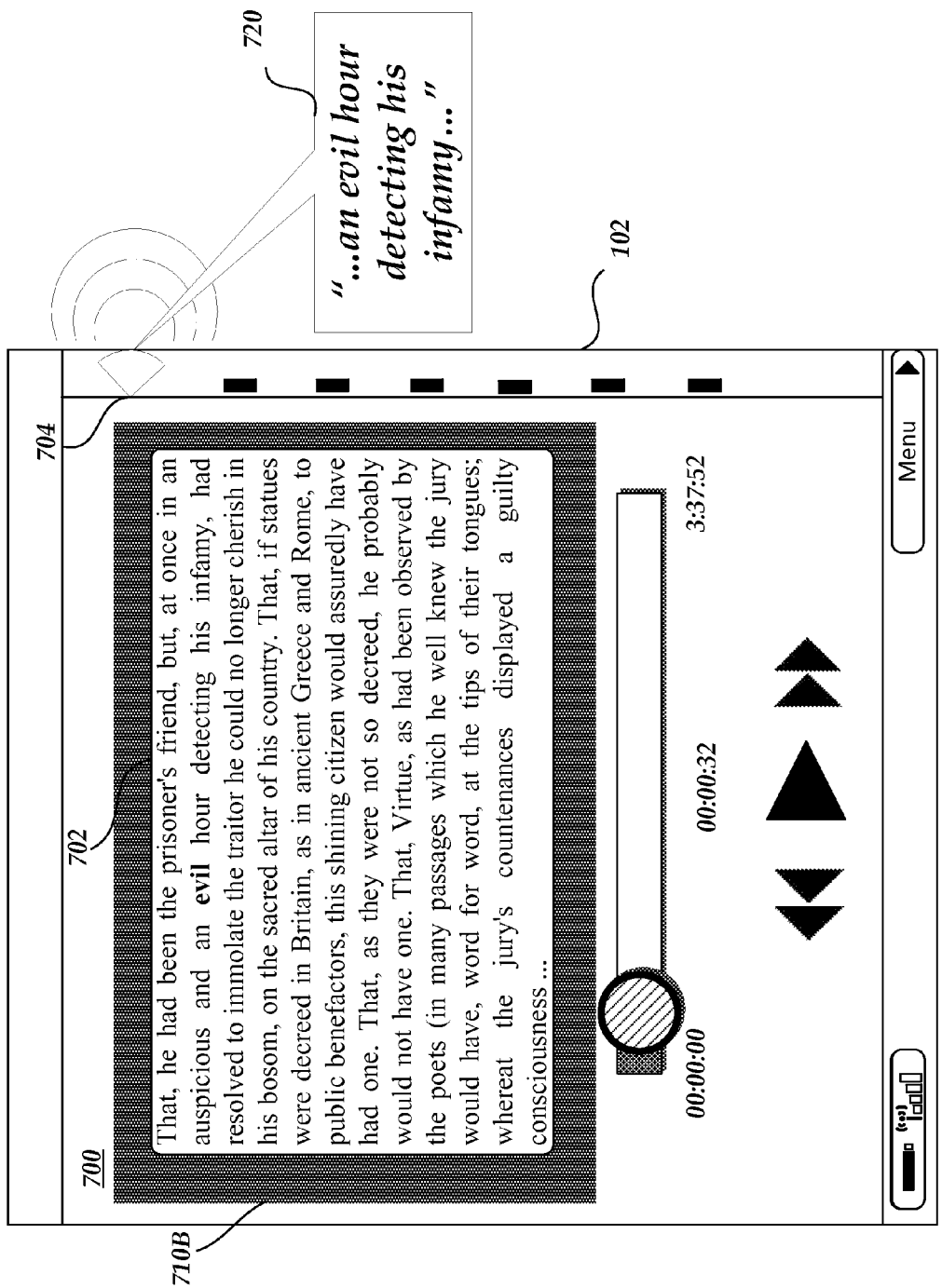

FIGS. 7A-B illustrate an example sequence of user interface representations illustrating color visualizations based on keywords of audio and/or text content. Such visualizations may provide mood, lighting, setting, atmosphere, and/or surface colors associated with the audio and/or text content that enhance the user experience with a user interface. As illustrated, the user interface 700 may be displayed on user computing device 102. The user interface may be generated at least in part by the user computing device 102 and/or the keyword service 110, depending on the embodiment. As illustrated, user computing device 102 may aurally present audio 720 corresponding to words via one or more speakers 704 and/or one or more audio outputs, which may be provided to speakers or headphones. Example user interface 700 additionally includes a displayed portion of the text content 702, which represents text of the spoken words of the audio data (such as an audiobook). Text content 702 is shown for illustrative purposes only and may not be displayed in other embodiments. The audio 720 presented in the illustrated example includes narrated audio content, which are the spoken words or phrases "an evil hour detecting his infamy."

The example user interface 700 includes color area and/or color visualization 710A. Data corresponding to the color area 710A may be retrieved and/or generated at least in part by the keyword service 110. For example, the text content 702 may include one or more words. The one or more words and/or current playback of the one or more words may be received by the keyword service 110 as input for searching and/or retrieving one or more color palettes as described herein. Text content 702 may include the word "evil" 712. The keyword service 110 may identify color palettes with names including word 712 and/or related to word 712. As illustrated, one or more colors 710A associated with the color palette may be visualized during current playback of the audio or text content. Thus, color may be used to enhance the user experience with color effects. Other techniques, as described herein, may be used for identifying color palettes associated with keywords such as presenting color visualizations associated with the affiliated colors or palettes based on the previously searched and/or determined color palette. Also, it will be appreciated that color visualization 710A may include images of colors associated with a color of a color palette, for example, images with extracted colors, such as images from a user's photograph album.

In some embodiments, color visualizations based on keywords may be used for different user computing devices and/or other media content with associated textual content. For example, a song may be played on user computing device 102 and the song may be associated with text corresponding to the lyrics of the song. Other examples of continuously-presented content with associated textual content may include podcasts, news programs, musical works, electronic books, television programs, video clips, movies, multimedia content, video games, and other types of content. Likewise, the associated textual content may include any type of digital textual content that is associated to the item of continuously-presented content, such as an electronic book, closed caption content, screenplay, script, libretto, transcription (e.g., speech-to-text) or other textual content. As will be appreciated, in some embodiments, textual content representing words spoken in various types of audio content may be determined dynamically using speech recognition and/or other known methods. Accordingly, in some embodiments, textual content for a given portion of audio content may be determined dynamically for keyword searching. For example, instead of using speech recognition for an entire song, which may be computationally expensive, the song may be sampled with speech recognition techniques, at regular intervals, to retrieve textual keywords at intervals that may be used to retrieve color palettes.

As illustrated in FIG. 7B, different colors of a color palette and/or affiliated color palettes may be presented to the user. For example, as playback continues of the media content, the color visualization 710B may have changed from color visualization 710A of FIG. 7A. The searched color palette corresponding to the identified keyword may include colors corresponding to color visualizations 710A and 710B. As playback continues the keyword service 110 may determine other words for searching for color palettes. In some embodiments, words may be selected at random and/or at predefined and/or configurable intervals. In some embodiments, the weighting and/or ranking data associated with color palettes and/or affiliated color palettes may be used to select preferred color palettes for color visualizations. In some embodiments, color palettes may be retrieved for a series of words in text content 702. The keyword service 110 may then retrieve the most frequent and/or dominant colors in the respective color palettes such that the associated color visualizations represent and/or associated with a majority of the words in a section of text content 702.

In some embodiments, color visualizations may be based on keywords from detected and/or input audio. An input device of user computing device 102 may detect and/or receive audio input data. For example, a microphone and/or other input device of user computing device 102 may detect ambient music and/or audio. One or more techniques, such as voice and/or speech recognition, may be used to convert the detected audio into one or more keywords and/or words. Thus, the keyword service 110 may use the color visualizations techniques described herein to cause the home screen and/or display of a user computing device 102 to present various color visualizations in response to detected audio such as ambient music (playing outside of the user computing device 102) or a conversation of persons nearby.

Example Color Palette Historical Data

FIG. 8A illustrates an example color palette associated with historical data. Aspects of color palette 802A-D may be similar to the color palettes of FIG. 5. However, in some embodiments, color palette 802A-D may be further associated with historical data. As illustrated, color palette 802A-D may be the same color palette, "palette 1," over time. For example, "palette 1" may be associated with times and/or dates one, two, three, and four, which correspond to the color palette 802A, 802B, 802C, and 802D.

Voting, ratings, and/or ranking data may also be associated with color palettes. As used herein, the terms votes, rating, and/or ranking are used to indicate that there is a value associated with the palette where the value is indicative of a level of human preference for the palette (such as contributed by a community of users and/or color data providers 130). For example, "palette 1" may be associated with ratings A, B, C, and D, which correspond to the color palette 802A, 802B, 802C, and 802D. Ratings A, B, C, and/or D may be relative to each other. In other words, A may have a greater rating than C, C may have a lower rating than B, etc. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another. Rating and/or ranking may also be determined by a number of views and/or hits. The ratings of the color palettes may also be associated with a time because each color palette may be associated with a creation time, last update time, etc. Thus, the keyword service 110 may use the time associated ratings to identify trends in color combinations and/or to identify color combinations, which are relatively stable over time (e.g., classic color combinations). This can also be used to determine color combinations, which were popular at a particular time. It will be appreciated that various types of trending and/or historical analysis may be performed on the historical data. For example, for a particular keyword associated color palette (e.g. "springtime"), the changes in colors associated with that color palette may be determined over time.

By using the votes of a community of users, the generated color palettes represent a subjective color combination that may be different from what a mathematical formula and/or machine may provide and which is generally preferable to users. Using human arbiters to generate color combinations can provide color palettes that mathematical algorithms and/or machines may be incapable of fully determining and/or creating.

As illustrated, the color palette data store may store historical data associated with color palette 802A-D. In some embodiments, there may be differences regarding how historical data associated with color palettes is stored. For example, base data associated with the color palette may be stored and historical data may be stored as changes from the base data, such that a color palette at a point time may be determined by iterating through the changes over time. In some embodiments, historical data of color palettes may be stored as snapshots in time (e.g., each color palette may be associated with one or more timestamps in a data store). For example, a single data store query and/or look up at time four for "palette 1" 802D may retrieve all of the data associated with the color palette if they are stored as discrete snapshots, records, and/rows in a data store associated with times, dates, and/or timestamps.

FIG. 8B illustrates example color palettes associated with historical data. Aspects of color palettes 804A-D may be similar to the color palettes of FIG. 5 and/or FIG. 8A. However, as illustrated in FIG. 8B, a plurality of color palettes associated with votes and/or times (e.g., creation time of a color palette, last update time of a color palette, etc.) may be compared with each other. For example, if a keyword search matches both palette 804C and 804D, palette 804D may be returned if votes G are greater than votes F. In some embodiments, votes may be weighted by date. For example, if a keyword search returns color palettes 804B, 804C, and 804D, with votes of 4, 1, and 1, respectively. Color palettes 804C and 804D may be rated and/or weighted higher than color palette 804B because color palettes 804C and 804D are more recent in time than color palette 804B. The keyword service 110 may also filter and/or have thresholds based on time for returning color palettes. For example, color palettes older than one year may not be returned.

FIG. 9 illustrates example color palettes associated with historical keyword data. Aspects of color palettes 902A-D and/or 904A-D may be similar to the color palettes of FIG. 5 and/or FIG. 8A-B. As illustrated in FIG. 9, a keyword and/or search phrase 910, here "springtime," at time one, may be associated with color palettes 902A-D. As previously discussed, the keyword and/or search phrase may be associated with color palettes 902A-D based on one or more color palette names and/or other data associated with the color palettes. As illustrated, at time one, the search phrase 910 may be associated with color palettes that have common aspects. For example, color palettes 902A-D may share a common color, here color one, which may correspond to a yellow color. Thus, at time one, the search phrase 910 may be associated with a yellow color. As illustrated, at time two, the search phrase 910 may be associated with color palettes 904A-D. There may be some overlap and/or differences between color palettes 902A-D and/or color palettes 904A-D. In other words, the search phrase at different points in time may be associated with same and/or different color palettes. In the example, palette one is both associated with time one and time two. However, some colors of palette one at time one may have changed at time two, as illustrated by color palettes 902A and 904A, respectively. Furthermore, some color palettes 904B-D may be associated with search phrase 910 at time two that were not associated with the search phrase 910 at time one. Lastly, a particular color may be associated with the search phrase 910 at time two that was not associated with the search phrase 910 at time one. For example, color palettes 904B-D may include the color thirteen (e.g., a green color), which was not associated with the color palettes at time one.

In some embodiments, the keyword service 110 and/or some other service may determine, select, and/or filter collections of color palettes based on the historical data associated with keywords and/or search phrases. As illustrated by FIG. 9, historical data associated with keywords and/or color palettes may indicate one or more color trends, trends in color preferences, and/or colors associated with keywords over time. In the example, the search phrase "springtime" 910 at time one was associated with a yellow color and/or at time two, the search phrase 910 was associated with a green color. Thus, the keyword service 110 may filter out color palettes and/or update a set of color palettes that do not match one or more color trends and/or may prioritize color preferences that correspond to the current color trends associated with the search phrase. For example, in some embodiments, the keyword service 110 may not return palette one (or may provide it a lower ranking) based on the search phrase 910 because palette one may be outside and/or not match the one or more color trends. In some embodiments, the keyword and/or search history techniques may be combined with other methods and/or techniques described herein, such as, but not limited to, affiliated colors, trending of palettes, ranking of palettes, and/or visualizations of color palettes.

In some embodiments, collections of color palettes associated with keywords and/or search phrases may be determined based on predictive models of color trends. One or more techniques for color manipulations, addition, subtraction, and/or predictive models may be used to select and/or determine color palettes. For example, color palettes associated with a search phrase at a time one may be predominantly red and color palettes associated with the same search phrase at a time two may be predominantly pink. Thus, the keyword service 110 and/or some other service may determine a color trend towards lighter colors within a red color space and/or range. As a result, the keyword service 110 may select and/or determine color palettes with colors lighter than pink for the search term at times one and two. In other words, the keyword service 110 may determine color trends of increasing lightness or darkness based on changes in colors and/or color palettes over time. Alternatively and/or additionally, color techniques such as color addition (adding red and green to make yellow), color subtraction (subtracting blue from yellow to make green), and/or vector math may be used to determine future color trends of color palettes. For example, color palettes associated with a search phrase at time one may include the color red, color palettes associated with the same search phrase at time two may include the color green. Thus, the keyword service 110, in response to receiving the same search phrase, may determine color palettes that include the color yellow because adding red to green makes yellow, which would comprise a predicted color trend.

In some embodiments, metadata associated with color palettes and/or search phrases may be used to determine color trends. For example, color palettes associated with the search keyword "Autumn" may trend towards more brown and/or orange colors at particular times and/or months during the year. Thus, cyclical patterns of color trends may be used to determine, predict, and/or select color palettes associated with particular keywords and/or phrases. Other metadata associated with color palettes and/or search phrases, which may be used for color trends, includes geolocation data, purchase data, and/or tags associated with data stores of images. For example, users may tag and/or label images with a particular keyword and/or phrase. If a user requests color palettes associated with the particular keyword and/or phrase, colors extracted from those images may be used by the keyword service 110 to select one or more color palettes with those colors. Thus, trending data associated with images tagged by keywords may be used to determine color palettes based on keyword searches with similar words to the words of the image tags. Trending geolocation data may include color palettes associated with particular regions or countries (e.g., color trends associated with a search phrase of "Big Ben" may be determined from color palettes created in England). Trending purchase data may include sales data and/or popular items associated with images comprising one or more colors. Thus, color palettes may be selected based on keywords associated with high selling items and with colors similar to the colors extracted from images of those high selling items.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:
1. A system comprising:
   a data store configured to store at least a plurality of color palettes and a plurality of images, wherein each color palette of the plurality of color palettes comprises a name and a plurality of colors, and wherein each image of the plurality of images comprises one or more colors; and
   a hardware processor in communication with the data store, the hardware processor configured to execute computer-executable instructions to at least:
   receive a search phrase;
   determine a first subset of the plurality of color palettes associated with the search phrase based at least in part on the names of the first subset of the plurality of color palettes, wherein the first subset of the plurality of color palettes are associated with a first time;
   determine a second subset of the plurality of color palettes associated with the search phrase based at least in part on the names of the second subset of the plurality of color palettes, wherein the second subset of the plurality of color palettes are associated with a second time;
   determine a color trend based at least in part on at least one of:
      presence of a first color in the first subset of the plurality of color palettes and the first color not being present in the second subset of the plurality of color palettes, or presence of a second color in the second subset of the plurality of color palettes and the second color not being present in the first subset of the plurality of color palettes;
update the second subset of the plurality of color palettes based at least in part on the determined color trend, wherein updating includes removing a first color palette from the second subset of the plurality of color palettes where the first color palette satisfies at least one of: comprising the first color or not including the second color;
identify, for each color of the plurality of colors of the updated second subset of the plurality of color palettes, an image matching the color; and
provide at least some of the identified images for presentation.

2. The system of claim 1, wherein the color trend comprises at least one popular color of the second subset of the plurality of color palettes associated with the second time.

3. The system of claim 1, wherein the color trend comprises at least one of a darker color trend or lighter color trend.

4. The system of claim 1, wherein the search phrase is based at least in part on user input.

5. The system of claim 1, wherein updating the second subset of the plurality of color palettes further comprises:
adding a second color palette to the second subset of the plurality of color palettes that satisfies at least one of: comprising the second color or not including the first color.

6. The system of claim 1, wherein the hardware processor is further configured to execute computer-executable instructions to at least determine, for each color of the plurality of colors of the updated second subset of the plurality of color palettes, one or more color names.

7. A computer-implemented method comprising:
under control of a hardware computing device configured with specific computer-executable instructions,
receiving a search phrase;
determining a first plurality of color palettes associated with the search phrase at a first time and a second plurality of color palettes associated with the search phrase at a second time;
determining a color trend based at least in part on at least one of:
presence of a first color in the first plurality of color palettes and the first color not being present in the second plurality of color palettes, or
presence of a second color in the second plurality of color palettes and the second color not being present in the first plurality of color palettes;
determining a plurality of color palettes associated with the search phrase based at least in part on names of the plurality of color palettes, wherein each color palette of the plurality of color palettes comprises one or more colors;
updating the plurality of color palettes based at least in part on the determined color trend, wherein updating the plurality of color palettes includes adding a first color palette to the plurality of color palettes where the first color palette satisfies at least one of: comprising the second color or not including the first color; and
identifying, for each color of the one or more colors of the updated plurality of color palettes, an image corresponding to the color.

8. The computer-implemented method of claim 7, wherein the color trend comprises at least one popular color of the plurality of color palettes.

9. The computer-implemented method of claim 7, wherein the color trend comprises at least one of a lighter color trend or darker color trend.

10. The computer-implemented method of claim 7, wherein the search phrase is based at least in part on user input.

11. The computer-implemented method of claim 7, wherein updating the plurality of color palettes further comprises:
removing a second color palette from the plurality of color palettes where the second color palette satisfies at least one of: comprising the first color or not including the second color.

12. The computer-implemented method of claim 7, wherein determining the color trend is further based at least in part on geolocation data associated with the search phrase.

13. The computer-implemented method of claim 7, wherein determining the color trend is further based at least in part on a cyclical color palette trend associated with the search phrase.

14. The computer-implemented method of claim 7, wherein determining the color trend is further based at least in part on purchase data of a plurality of items associated with the search phrase, and wherein each item of the plurality of items is associated with an item image comprising one or more colors.

15. A non-transitory computer-readable storage medium storing computer executable instructions that when executed by a processor perform operations comprising:
receiving a search phrase;
determining a first plurality of color palettes associated with the search phrase at a first time and a second plurality of color palettes associated with the search phrase at a second time;
determining a color trend based at least in part on at least one of:
presence of a first color in the first plurality of color palettes and the first color not being present in the second plurality of color palettes, or
presence of a second color in the second plurality of color palettes and the second color not being present in the first plurality of color palettes;
determining a plurality of color palettes associated with the search phrase based at least in part on names of the plurality of color palettes, wherein each color palette of the plurality of color palettes comprises one or more colors;
updating the plurality of color palettes based at least in part on removing a particular color palette of the plurality of color palettes where the particular color palette satisfies at least one of: comprising the first color or not including the second color; and
identifying, for each color of the one or more colors of the updated plurality of color palettes, an image corresponding to the color.

16. The non-transitory computer-readable storage medium of claim 15, wherein determining the color trend is further based at least in part on purchase data associated with a plurality of items associated with the search phrase, and wherein each item of the plurality of items is associated with an item image comprising one or more colors.

17. The non-transitory computer-readable storage medium of claim 15, wherein the operations further comprise:

identifying a geographic area associated with the search phrase;

identifying geolocation data associated with the particular color palette;

determining that the geolocation data does not correspond to the geographic area, wherein removing the particular color palette is further based at least in part on the determination that the geolocation data not correspond to the geographic area.

18. The non-transitory computer-readable storage medium of claim 15, wherein the search phrase is based at least in part on user input.

19. The non-transitory computer-readable storage medium of claim 15, wherein presence of a first color in the first plurality of color palettes corresponds to a first color palette comprising the first color, the first color palette from the first plurality of color palettes.

20. The non-transitory computer-readable storage medium of claim 15, wherein determining the color trend is further based at least in part on geolocation data associated with the search phrase.

\* \* \* \* \*